Jan. 29, 1957 R. L. CUNNINGHAM 2,779,825

AUTOMATIC CONTROL FOR SOUND REPRODUCING EQUIPMENT

Filed June 3, 1955

INVENTOR.
Ronald L. Cunningham
BY
McGrew & Edwards
ATTORNEYS 2,779,825
Patented Jan. 29, 1957

2,779,825

AUTOMATIC CONTROL FOR SOUND REPRODUCING EQUIPMENT

Ronald L. Cunningham, Englewood, Colo.

Application June 3, 1955, Serial No. 512,926

18 Claims. (Cl. 179—100.1)

This invention relates to controls for sound reproducing equipment of the continuous playing type and particularly to an improved reversing control for such equipment employing a dual track or similar record.

Many applications have been found for sound reproducers capable of continuous reproduction of music for extended periods of time. For example, background music may be provided in restaurants, stores, factories, public waiting rooms and the like. Continuous sound reproducers employing tape recordings have been found highly satisfactory for such installations. Dual sound track tape and reversible reproducing equipment may be employed, one track being used when the tape is moving in one direction and the other track when the tape is reversed. Such equipment may be reversed automatically in response to a predetermined signal at the end of each sound track, and continuous tape reproducers are available on the market which operate in this manner. The controls for equipments of this type so far available have not proved entirely satisfactory under all conditions of operation for example, audio signals employed for reversing may be such that some recordings may effect a false reverse signal. Accordingly it is an object of the present invention to provide an improved reversing control for dual track continuous sound reproducers.

It is another object of this invention to provide a reversing control for continuous tape sound reproducers including an improved arrangement for automatically initiating the reversing operation.

It is another object of this invention to provide a continuous dual sound track tape reproducer including an improved control dependent upon termination of sound reproduction from either sound track for reversing the equipment to use the other track.

It is a further object of this invention to provide an improved control for sound reproducing equipment of the continuous play type to introduce pauses between selections.

Figure 1:
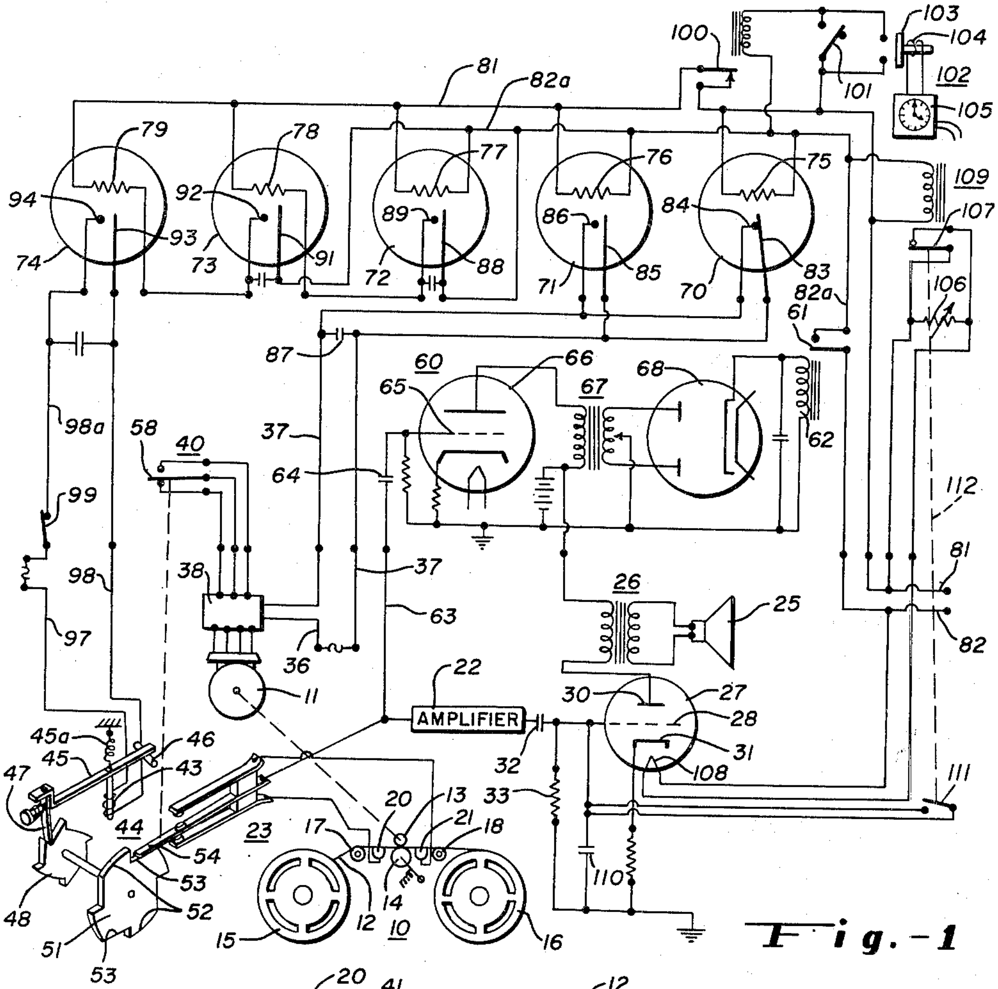
Figure 2:
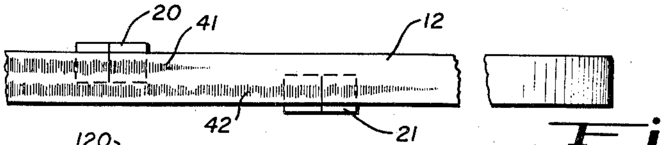

The novel features which are believed to be characteristic of this invention are set forth in the appended claims. The invention itself, however, both as to its organization and method of operation, together with further objects and advantages thereof, may best be understood from the following description taken in connection with the accompanying drawing in which:

Fig. 1 diagrammatically represents a continuous tape reproducer provided with a control embodying the invention;

Fig. 2 is an enlarged view of the tape and pick-up heads of Fig. 1; and

Figure 3:
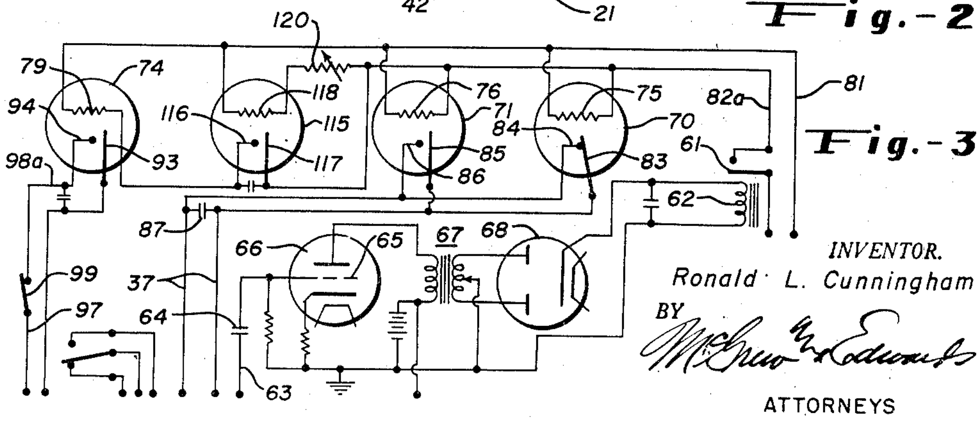

Fig. 3 diagrammatically represents another embodiment of the invention.

Briefly, in carrying out the objects of this invention in both illustrated embodiments, a continuous tape sound reproducing equipment provided with a control for reversing the direction of movement of the tape and for changing the sound pick-up from one track of the tape to the other is provided with a reversing control responsive to absence of the audio signal or to a decrease in intensity below a predetermined minimum for initiating the reversing operation. Thermal type time delay relays are employed to insure reversal only on stopping or reduction of the signal for a predetermined interval thereby avoiding false signal reversing caused, for example, by pauses in the music being reproduced. An arrangement is provided to stop the tape upon occurrence of an interval of silence or below minimum signal and hold it stopped for a short period thereby providing a pause between selections without the use of a blank length of tape. The system may also include a "fade in" control for minimizing the effects of the sudden starting of the music after each pause in the program matrial and also on starting of the equipment.

Referring now to the drawing the sound reproducing system illustrated in Fig. 1 includes a tape transport unit 10 driven by a motor 11 which propels a tape record 12 by rotating a capstan 13 against which the tape is held by a spring pressed idler wheel 14. The tape is wound on reels 15 and 16 and is guided into position with respect to the capstan by guide rollers 17 and 18 which also maintain the tape in position with respect to forward and reverse playback or pick-up heads 20 and 21, respectively.

The pick-up heads are connected alternatively to an amplifier 22 by operation of a single pole double throw selector switch 23 which is shown in position to connect the forward head 20 to the amplifier. The output of the amplifier is connected through a final stage 24 to drive a loudspeaker 25 through an output transformer 26. The final amplifier stage 24 comprises an electron discharge device 27 having a grid or control electrode 28, an anode 30 and a cathode 31, the grid being coupled to the amplifier 22 through a capacitor 32 across a resistor 33. The plate voltage supply for the stage 24 has been indicated diagrammatically as a battery 34 connected in the usual manner to the anode 30 through the primary of the output transformer.

The motor 11 is connected to power supply terminals 35 through an energizing circuit including supply leads 26 and 37 and a reversing control 38. The reversing control is actuated by operation of a single pole double throw switch 40 which is mechanically connected to be operated simultaneously with the switch 23, the switch 40 being shown in its position for actuating the control 38 to connect the motor for forward movement of the tape. It will thus be apparent that the switches 23 and 40 operate together to control the tape transport unit so that on forward movement of the tape the head 20 is active and on reverse movement the head 21 is active.

As illustrated in Fig. 2 the tape 12 is of the dual sound track type, it having an upper track 41 and a lower track 42 extending parallel to one another along respective sides of the center line of the tape. The upper track is in operative position with respect to the forward head 20 and the lower track is in operative position with respect to the reverse head 21.

The reversing of the motor 11 and selection of the heads 20 and 21 is effected by energization of a solenoid 43 of a stepping relay 44. The relay 44 is of the impulse type, each energization of the solenoid 43 effecting a change in the position of the switches 23 and 40 actuated by the relay. When the solenoid 43 is energized it draws a bar 45 downwardly about a pivot 46 against the force of a spring 45*a* and brings an adjustable finger 47 mounted on the outer end of the bar into engagement with a tooth on a ratchet wheel 48 and rotates the wheel counterclockwise. The wheel 48 is mounted on a shaft 50 which also carries a switch actuating cam wheel 51 having equally spaced alternate circumferential surfaces 52 and chordal surfaces 53. The operating arm or pole 54 of the switch 23 extends into a position to be engaged by either a surface 52 or a surface 53 of the wheel 51, it being shown in its lower position in engagement with a chordal surface 53. The arm 54 is connected to the input of the amplifier 22 so that in its lower position, as shown, it engages a contact 55 on the lower bracket of the switch and connects the pick-up head 20 to the amplifier, and in its upper position when resting on a surface 52 it engages a contact 56 on the upper bracket of the switch and connects the head 21 to the amplifier. The switches 23 and 40 are mechanically interlocked by a link indicated by a dotted line 57 which is connected between the arm 54 and the pole of the switch 40 indicated at 58. This interlocking connection assures simultaneous interchange of the pick-up heads and reversal of the motor 11.

In order that the equipment be reversed automatically at the end of the recording on each track it is necessary to provide apparatus for detecting the end of the recording and for initiating the reversing of the system. In order to reverse the equipment shown in Fig. 1 a time delay control 60 is provided which starts to operate when the recorded sound terminates and which energizes the solenoid 43 whenever the audio signal of the sound track is interrupted for more than a predetermined time interval.

The device 60 includes a normally closed switch 61 which is held open by a relay or solenoid 62 when it is energized during the existence of an audio signal on the tape 12. Whenever there is an audio signal on the tape it is supplied through a line 63 and capacitor 64 and is impressed on the control electrode 65 of an electron discharge device or tube 66. The output of the device 66 is coupled through a transformer 67 to a full wave rectifier tube 68. The solenoid 62 is connected in the output of the rectifier 68 and is thus energized to retain the switch in its open position whenever there is a sufficient audio signal on the tape 12. The intensity of the signal necessary to hold the switch 61 open is selected to be less than the intensity of the signal corresponding to the lowest intensity of any passage of the music of the recordings with which the equipment is to be used; and preferably the circuit is made dependent upon termination of the audio signal at the end of the recording; thus a leader tape with no sound track may be employed at the ends of the tape.

The system illustrated is arranged to reverse the reproducer whenever the audio signal on the sound track is interrupted for a predetermined interval of time; this time interval being selected to be greater than any normal pause in the recorded music or other audio signal. In order to effect the reversal dependent upon termination of the audio signal there is employed a time delay apparatus comprising a series of thermally actuated time delay relays 70, 71, 72, 73 and 74. The relays preferably are of the enclosed hermetically sealed type provided with plug in bases so that they may easily be removed or replaced. These relays include heater elements 75, 76, 77, 78, and 79, respectively, arranged to be energized when connected to heater current supply lines 81 and 82. Whenever the switch 61 is returned to its closed position by deenergization of the solenoid 62 upon termination of the signal or its reduction to less than a predetermined minimum intensity the heaters 75, 76, and 77 are connected across the supply lines 81 and 82 in parallel and are energized. The upper portion of the line 82 under control of the switch 61 has been designated 82*a*. The relay 70 has normally closed contacts connected in the lead 37 of the motor energizing circuit and is a quick operating relay; when the heater 75 has been energized for, say, three to five seconds a thermal element 83 moves to the right out of engagement with a fixed contact 84 to open the motor circuit and stop the motor 11. It will be understood, of course, that should the signal be resumed and the switch 61 opened before parting of the element 83 from the contact 84 the heater 75 will be deenergized and the relay 70 will remain closed to keep the motor in operation. After the relay 70 opens and at the end of a predetermined time interval, say, forty-five seconds the heater 76 will actuate the relay 71. This relay is provided with a thermal element 85 and a fixed contact 86 which are normally open and are connected in parallel with the contacts of relay 70 so that on heating the element 85 bends to the left to close the motor circuit and restart the tape. A small capacitor 87 is shunted across the contacts of the relays 70 and 71 to prevent sparking at the contacts on opening. The motor is thus restarted and the tape again moves; and if no signal above the predetermined minimum is present the switch 61 remains closed.

This stop and restart arrangement is provided so that a pause of say forty-five or more seconds may be introduced between musical selections in the program without requiring a corresponding length of blank tape. Thus a substantial saving of tape is effected and a much longer group of selections may be recorded on a single reel. If the tape has been stopped by a pause between selections the signal of the next selection will be present immediately after restarting and the switch 61 opened to restore normal operation.

If no signal is present on the tape after restarting the relay heaters remain energized and at the end of a predetermined time the equipment is reversed as a result of the operation of relays 72, 73 and 74. The relay 72 is of the same characteristics as the relay 71 and has normally open contacts connected in series with the heater 78 of the thermal relay 73 across the supply lines 81 and 82*a*; thus the heater 78 is energized, say forty-five seconds after closing of the switch 61 by movement of a thermal element 88 into engagement with a fixed contact 89. The relay 73 is normally open and includes a thermal element 91 and a fixed contact 92; after the heater 78 has been energized for a predetermined length of time, say ninety seconds, the element 91 moves to the left into engagement with the contact 92 and connects the heater 79 of the final relay 74 across the heater supply lines 81 and 82*a*.

Energization of the heater 79 heats a thermal element 93 of the relay 74 and bends it to the left into engagement with a fixed contact 94 thereby closing the normally open contacts of the relay. These normally open contacts are connected in a control circuit for energizing the solenoid 43 and changing the condition of operation of the sound reproducing equipment by reversing the motor and interchanging the pick-up heads 20 and 21. The circuit for the solenoid 43 includes supply current terminals 95 and 96 and extends from terminal 95 through a lead 97 to the solenoid thence through a connection 98 to the element 93 of the relay 74 to the contact 94 and through a lead 98*a* and a manual switch 99 to the supply terminal 96. The relay 74 is a quick acting relay similar to the relay 70 but with normally open contacts and may close within, say, three to five seconds after energization of the heater 79. The relay 74 is also quick opening and the contacts 93 and 94 separate very quickly after the heater is deenergized. The fast operating characteristics of the relay 74 insure closing and opening of the control circuit quickly and positively without chattering or hesitation so that single pulse acutation of the solenoid 43 is assured.

The time delay period of the relay 73 is selected to insure reversal of the reproducer equipment only in the event there is no audio signal or a signal less than a predetermined minimum for a period longer than any normal pause in the music or other sound recorded on the tape 12.

Should it be desired when the tape is to be changed or for other reasons to prevent reversal at the end of one sound track the switch 99 is opened so that the equipment is not reversed and the tape is merely wound completely onto the take-up reel. Should it be desired to provide a pause between selections greater than the normal pre-set pauses determined by the relays 70 and 71, a switch 100 in the heater supply conduit 81 may be opened to prevent energization of any relay heaters other than the first relay heater 75. Thus at the end of a selection the motor circuit is deenergized by opening of the relay 75 and is not reclosed because the relay 71 cannot be operated. The switch 100 is operated by a solenoid 101 connected across the leads 81 and 82*a* in series with a time switch 102 shunted by a manual switch 102*a*. The time switch comprises a normally open element 103 arranged to be closed at a preselected time by a solenoid 104 actuated by a clock 105. The clock is preferably of the type which may be set to open the switch again at the end of a predetermined period so that the length of the automatic pause may be pre-set.

It is often desirable to start a musical selection with a gradual increase in intensity to avoid annoyance to listeners which can be caused by sudden change from silence to the full volume of a musical selection. The pleasing effect of "fading in" the music is accomplished in the present apparatus by providing a variable resistor 106 shunted by a normally closed switch 107 and connected in the supply circuit of the cathode heater 108 of the electron discharge device 27. The switch 107 is opened by a relay 109 whenever the switch 61 is closed. Thus the resistance 106 is placed in series with the cathode heater 108 and reduces the energization of the heater so that a predetermined time must elapse after opening of the switch and restoring of the audio signal before the cathode 31 is again fully heated; as a result the output of the device 27 increases gradually when the audio signal is restored and provides the "fade in" effect.

In order to prevent high frequency sounds or hissing when the recording is not being reproduced a capacitor 110 may be provided between the control electrode 28 and ground thereby shunting out the unwanted signals. The capacitor is connected for this purpose whenever the switch 61 is closed by closing of a switch 111 connected by a linkage indicated by the dotted line 112 to the switch 107 so that the two switches are actuated simultaneously by the solenoid 109.

A modified form of the time delay control is shown in Fig. 3; this embodiment is similar to that of Fig. 1 and corresponding parts have been designated by the same numerals. The control of Fig. 3 differs from that of Fig. 1 in that a single thermal relay 115 is employed instead of the two relays 72 and 73 to secure the required time delay between closing of the switch 61 and actuation of the final relay 74. In addition to this change and merely for purposes of simplification the switches 101, 103, and 107 and their controls have been omitted. The thermal relay 115 is provided with normally open contacts including a fixed contact 116 and a thermal element 117 connected in series with the heater 79 of the relay 74. The thermal element 117 is actuated to close the contacts by a heater 118 which is connected across the lines 81 and 82 in series with a variable resistance 120. The time delay and other characteristics of the relay 115 are substantially the same as those of the relay 71; however, the resistance 120 reduces the rate of heating of the heater 118 and delays the actuation of the relay 115 with respect to the relay 71, this delay being of the same order as that secured by operation of the relay 73 of Fig. 1.

During operation the reversing or changeover controls described above provide positive actuation and are not subject to variation or faulty operation such as might result from false signals in other types of systems.

From the foregoing it is readily apparent that this invention provides a simple reliable and effective changeover control for reversible record continuous sound reproducing systems. While the invention has been described in connection with a specific type of sound reproducing equipment other applications and modifications will occur to those skilled in the art. Therefore, it is not desired that the invention be limited to the specific constructions and arrangements illustrated and described and it is intended by the appended claims to cover all modifications which fall within the spirit and scope of the invention.

I claim:

1. A control for an audio signal reproducing equipment including a normally closed control switch, means responsive to the audio signal of the reproducer equipment for moving said switch to its open position and for maintaining it open while the signal remains above a predetermined level of intensity, a control circuit for effecting a change in an operating condition of the signal reproducing equipment, an energizing circuit for the equipment, means dependent upon the closing of said switch for initiating operation of said control circuit, said means including a second normally closed switch in said energizing circuit for opening said energizing circuit and a first normally open relay connected in parallel with said second switch for reclosing said energizing circuit at the end of a predetermined interval after closing of said first mentioned switch, and means including a second normally open relay in said control circuit for actuating said control circuit upon closing to change the operating condition of the equipment a predetermined time after the closing of said first normally open relay.

2. A control for an audio signal reproducing equipment including a normally closed control switch, means responsive to the audio signal of the reproducer equipment for moving said switch to its open position and for maintaining it open while the signal remains above a predetermined level of intensity, a control circuit for effecting a change in an operating condition of the signal reproducing equipment, an energizing circuit for the equipment, time delay means dependent upon the closing of said switch for initiating operation of said control circuit, said time delay means including a normally closed relay for opening said energizing circuit a predetermined interval after closing of said switch and a first normally open relay connected in parallel with said normally closed relay for reclosing said energizing circuit at the end of a longer predetermined interval after closing of said switch, and means including a second normally open relay in said control circuit for actuating said control circuit upon closing to change the operating condition of the equipment a predetermined time after the closing of said first normally open relay.

3. A control for an audio reproducing equipment in accordance with claim 2 and including means for rendering said second normally open relay ineffective to energize said circuit for a predetermined interval after closing of said first normally open relay whereby reclosing of said switch upon increase of the intensity of the audio signal to a value above said predetermined level during said interval prevents energization of said circuit.

4. In a continuous play sound reproducing equipment of the type employing a tape recording having two parallel sound tracks one played on forward movement of the tape and the other on reverse movement, a tape driving motor, an energizing circuit for the motor, a reversing control for the motor, a time delay apparatus including a switch for actuating said reversing control a predetermined time interval after operation of said switch, pick-up means and an amplifier for reproducing audio signals alternatively from said two sound tracks, and means dependent upon a reduction of the intensity of the audio signal on one of said sound tracks to a predetermined minimum level for actuating said switch to initiate operation of said time delay apparatus to reverse the motor at the end of said interval of time to effect reproduction of sound from the other of said sound tracks.

5. In a continuous play sound reproducing equipment of the type employing a tape recording having two parallel sound tracks one played on forward movement of the tape and the other on reverse movement thereof, a tape driving motor, an energizing circuit for the motor, a reversing control for connecting the motor to drive the tape in either direction, pick-up means and an amplifier for reproducing audio signals alternatively from said two tracks, and means dependent upon a reduction of the intensity of the audio signal on one of said sound tracks below a predetermined minimum level for actuating said reversing control to reverse said tape and effect reproduction of sound from the other of said sound tracks, said last mentioned means comprising a first time delay relay having normally closed contacts connected in said motor energizing circuit and a second time delay relay having normally open contacts connected in parallel with said normally closed contacts for stopping said tape in the event said signal is not resumed at the end of a predetermined initial interval and for re-starting said tape at the end of a predetermined period thereafter, a third relay having normally open contacts connected on closing to actuate said tape reversing control, and means including an intermediate time delay relay for energizing said third relay a predetermined interval of time after the starting of said tape to actuate said reversing control and reverse said tape to effect reproduction of sound from said other of said sound tracks.

6. A control for an audio signal reproducing equipment including a normally closed control switch, means responsive to the audio signal of the reproducer equipment for moving said switch to its open position and for maintaining it open while the signal remains above a predetermined level of intensity, a control circuit for effecting a change in an operating condition of the signal reproducing equipment, an energizing circuit for the equipment, time delay means dependent upon the closing of said switch for initiating operation of said control circuit, said time delay means comprising first, second and third thermal relays having heater elements connected to be energized upon closing of said switch, said first relay operating a relatively short time after energizing of its heater and having normally closed contacts connected in said energizing circuit, said second relay operating at a longer time interval and having normally open contacts connected in parallel with the contacts of said first relay, a fourth thermal relay having normally open contacts in said control circuit, and means including normally open contacts on said third relay for connecting the heating element of said fourth relay to be energized a predetermined time after operation of said second relay whereby the condition of operation of said equipment is changed a predetermined interval after closing of said energizing circuit.

7. A control for audio reproducing equipment in accordance with claim 6 wherein said second and third relays have substantially the same time characteristics and said last mentioned means includes a resistor in series with the heater element of said third relay.

8. A control for audio reproducing equipment in accordance with claim 6 wherein said second and third relays have substantially the same characteristics and said last mentioned means comprises a fifth thermal relay having its heater element connected to be energized upon the closing of said contacts of said third relay, and normally open contacts on said fifth relay connected on closing to complete an energizing circuit for the heater element of said fourth relay.

9. A control for audio reproducing equipment in accordance with claim 6 wherein said heater elements are arranged to be connected in parallel across a pair of current supply lines controlled by said switch, and a second switch for disconnecting from said supply lines the heater of said second relay whereby closing of said energizing circuit by said second relay is prevented.

10. A control for an audio signal reproducing equipment including a normally closed control switch, means responsive to the audio signal of the reproducer equipment for moving said switch to its open position and for maintaining it open while the signal remains above a predetermined level of intensity, a control circuit for effecting a change in an operating condition of the signal reproducing equipment, an energizing circuit for the equipment, time delay means dependent upon the opening of said switch for initiating operation of said control circuit, said time delay means including a normally closed relay for opening said energizing circuit a predetermined interval after opening of said switch and a first normally open relay for reclosing said energizing circuit at the end of a predetermined longer time interval after opening of said switch, and means including a second normally open relay for actuating said control circuit to change the operating cindition of the equipment a predetermined time after the closing of said first normally open relay, said equipment including an electron discharge device having a cathode and an anode and a control electrode for amplifying said audio signal, a heater for said cathode and an energizing circuit for the heater, said signal responsive means being connected to the signal circuit of said equipment ahead of said device, and means including a relay connected to be energized upon closing of said switch for decreasing the energization of said heater circuit whereby upon opening of said switch the output intensity of the signal of said device is increased gradually.

11. In a continuous play sound reproducing equipment of the type employing an elongated record adapted to be wound on a reel, a record driving motor, means connecting the motor to drive said record in a predetermined direction, an energizing circuit for said motor, means for reproducing audio signals from said record, control means dependent upon a reduction of the intensity of the reproduced audio signal to a value below a predetermined level for a predetermined time interval for opening said energizing circuit to stop said motor, and time delay means for reclosing said circuit to restart said motor to drive said record in the same direction at the end of a second predetermined period.

12. In a continuous play sound reproducing equipment of the type employing an elongated record adapted to be wound on a reel, a record driving motor, an energizing circuit for said motor, means for reproducing audio signals from said record, first and second thermally actuated time delay relays connected in parallel with one another and in series in said energizing circuit and having the heater elements connected in parallel, said first relay having normally closed contacts and being a short period relay and said second relay having normally open contacts and being a relatively longer period relay, a heater excitation circuit, a normally closed switch in said heater excitation circuit, and means dependent upon the reproduction by said first means of audio signals above a predetermined intensity for holding said normally closed switch in its open position whereby upon reduction of the signal to a value below said intensity said first relay is actuated to stop said record and at the end of said predetermined longer period said second relay closes to restart said record, said relays being restored to their normal positions upon occurrence of an audio signal above said predetermined intensity.

13. In a continuous play sound reproducing equipment, in combination, record means providing at least two sound tracks, means for driving said record means, means for producing audio signals from said record means, means dependent upon a reduction of the intensity of the reproduced audio signal to a value below a predetermined level for a first predetermined time interval for inactivating said driving means, means for restarting the driving of said record means at the end of a second time interval greater than said first interval, and means dependent upon continued reduced intensity of said audio signals for a third predetermined interval beginning upon termination of said second interval for transferring said signal producing means from one of said sound tracks to another.

14. In a continuous play sound reproducing equipment, in combination, record means providing at least two sound tracks, means for driving said record means, means for producing audio signals from said record means, a first switch and a second switch, means dependent upon a reduction of the reproduced signal to a value below a predetermined level for actuating said first switch, time delay means dependent upon actuation of said first switch for actuating said second switch a predetermined interval of time after actuation of said first switch, and means dependent upon actuation of said second switch for transferring said signal producing means from one of said sound tracks to another.

15. In a continuous play sound reproducing equipment, the combination set forth in claim 14 including means for interrupting the operation of said time delay means to prevent actuation of said second switch upon restoration of said audio signal during said predetermined interval of time.

16. In a continuous play sound reproducing equipment, the combination set forth in claim 14 wherein said time delay means comprises a thermally actuated relay having a heater controlled by actuation of said first switch.

17. In a continuous play sound reproducing equipment of the type employing a record having two sound tracks one played on forward movement of the record and the other on reverse movement thereof, means including a motor for driving the record, reversing means for connecting the motor to drive the record in either direction, a time delay apparatus including a switch for actuating said reversing means a predetermined time interval after operation of said switch, pick-up means and an amplifier for reproducing audio signals alternatively from said two sound tracks, and means dependent upon a reduction of the intensity of the audio signal on one of said sound tracks to a predetermined minimum level for actuating said switch to initiate operation of said time delay apparatus to actuate said reversing means at the end of said interval of time to effect reproduction of sound from the other of said sound tracks.

18. In a continuous play sound reproducing equipment of the type employing an elongated record adapted to be wound on a reel, means including a motor for driving said record in a predetermined direction, an energizing circuit for said motor, means for reproducing audio signals from said record, control means dependent upon a reduction of the intensity of the reproduced audio signal to a value below a predetermined level for a predetermined time interval for operating said driving means to stop said record, and time delay means for operating said driving means to restart said record and drive it in the same direction at the end of a second predetermined period.

References Cited in the file of this patent

UNITED STATES PATENTS

| | | |
|---|---|---|
| 2,214,482 | Schmidt | Sept. 10, 1940 |
| 2,608,608 | Handschin | Aug. 26, 1952 |
| 2,719,884 | Reed | Oct. 4, 1955 |